United States Patent [19]

Torrielli et al.

[11] Patent Number: 5,005,858
[45] Date of Patent: Apr. 9, 1991

[54] HYDROPNEUMATIC VEHICLE SUSPENSION SYSTEM OF VARIABLE ATTITUDE

[75] Inventors: Vittorino Torrielli, Turin; Virginio Maggioni, Rosta, both of Italy

[73] Assignee: Fiat Auto S.p.A., Turin, Italy

[21] Appl. No.: 452,750

[22] Filed: Dec. 21, 1989

[30] Foreign Application Priority Data

Dec. 23, 1988 [IT] Italy ................. 68150 A/88

[51] Int. Cl.⁵ .............................................. B60G 11/26
[52] U.S. Cl. ...................................... 280/707; 280/714
[58] Field of Search ............................ 280/707, 714

[56] References Cited

U.S. PATENT DOCUMENTS

| | | | |
|---|---|---|---|
| 3,938,823 | 2/1976 | Hiruma | 280/703 |
| 4,846,496 | 7/1989 | Tanaka et al. | 280/707 |

FOREIGN PATENT DOCUMENTS

| | | |
|---|---|---|
| 0219864 | 4/1987 | European Pat. Off. . |
| 0286072 | 10/1988 | European Pat. Off. . |
| 2043526 | 3/1972 | Fed. Rep. of Germany . |
| 2431027 | 1/1975 | Fed. Rep. of Germany . |
| 2604809 | 8/1977 | Fed. Rep. of Germany . |
| 3902312 | 8/1989 | Fed. Rep. of Germany . |
| 2565170 | 12/1985 | France . |
| 2576555 | 8/1986 | France . |

Primary Examiner—Kenneth R. Rice
Attorney, Agent, or Firm—Shlesinger Arkwright & Garvey

[57] ABSTRACT

A hydropneumatic suspension system having the characteristic of being able to vary at will, and independently of each other, the rigidity of the sustaining and load-adaptation means of each vehicle wheel, consisting of a series of sensors for measuring the dynamic attitude of the vehicle connected to a central electronic control unit, and respective hydraulic dampers of adjustable internal pressure, which support the wheels and are connected to respective hydropneumatic service accumulators the internal pressure of which is controlled by solenoid valves controlled by the central control unit; hydraulic energy can be supplied to the accumulators by, for example, the servo-steering system pump via a common main accumulator. (FIG. 1).

6 Claims, 2 Drawing Sheets

HYDROPNEUMATIC VEHICLE SUSPENSION SYSTEM OF VARIABLE ATTITUDE

BACKGROUND OF THE INVENTION

This invention relates to an intelligent hydropneumatic suspension system of variable attitude for a vehicle, which limits the vehicle pitch and roll in the case of sudden manoeuvres such as strong acceleration or deceleration or taking bends at high speed, and controls vertical forces if separation from the ground takes place.

It is known to control the attitude of a motor vehicle by self-levelling suspension systems able to keep the vehicle in a constant or predetermined spatial attitude as the loads (both static and dynamic) which act on it vary, for example so as to prevent or as far as possible limit any variation in the longitudinal attitude of the vehicle as the weight (due to both luggage and passengers) acting on its rear axle varies, and likewise limit any vehicle pitching or rolling during sudden manoeuvres such as sudden acceleration or deceleration, or the taking of bends at high speed.

The most efficient suspension system is that based on so-called "active hydrualic syspensions" which vary their attitutde in real time as the vehicle attitude varies. Such suspensions are however relatively complicated, require the use of special actuators, are of high energy consumption and in general are of costly construction. As an alternative it is known to use so-called "slow active" pneumatic suspensions which are much simpler and less costly to construct. This latter suspension system has however, the drawback of a relatively long response time, so that even if it is able to ensure self-levelling of the vehicle as the static loads (represented by the luggage and passengers) acting on it vary, it is not totally able to prevent phenomena such as vehicle rolling or pitching during sudden manoeuvres.

SUMMARY OF THE INVENTION

The object of the invention is to provide a variable-attitude hydropneumatic suspension system of limited cost, simple construction, low energy consumption and high performance, which when the vehicle attitude varies is able to act quickly to at least limit vehicle rolling and pitching connected with sudden manoeuvres.

Said object is attained according to the invention by a vehicle hydropneumatic suspension system of variable attitude, of the type comprising, for each wheel, sustaining and load adaptation means of variable rigidity, characterised by comprising a plurality of vehicle dynamic attitude sensors and a central electronic control unit connected to said sensors, said sustaining and load adaptation means comprising, for each wheel, at least one respective hydraulic damper of variable internal pressure permanently connected hydraulically to a respective hydraulic service accumulator which is connected to a pressure source via a first solenoid valve controlled by said central control unit.

BRIEF DESCRIPTION OF THE DRAWINGS

The invention will be more apparent from the description of one embodiment thereof given hereinafter by way of non-limiting example with reference to the accompanying drawings in which.

DETAILED DESCRIPTION OF THE INVENTION

Figure 1:
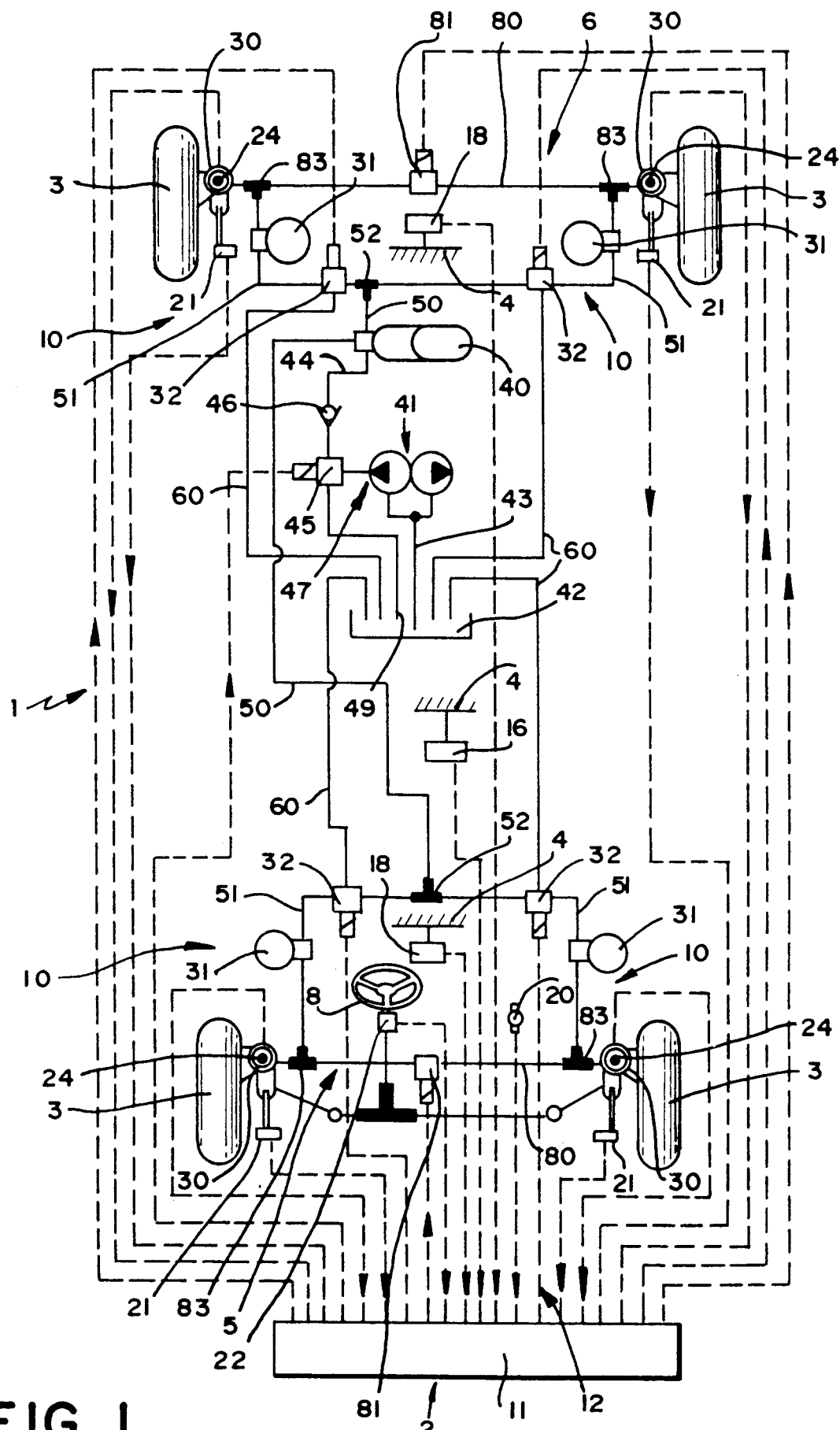
FIG. 1 is a diagrammatic plan view of a vehicle provided with the suspension system according to the invention.
Figure 2:
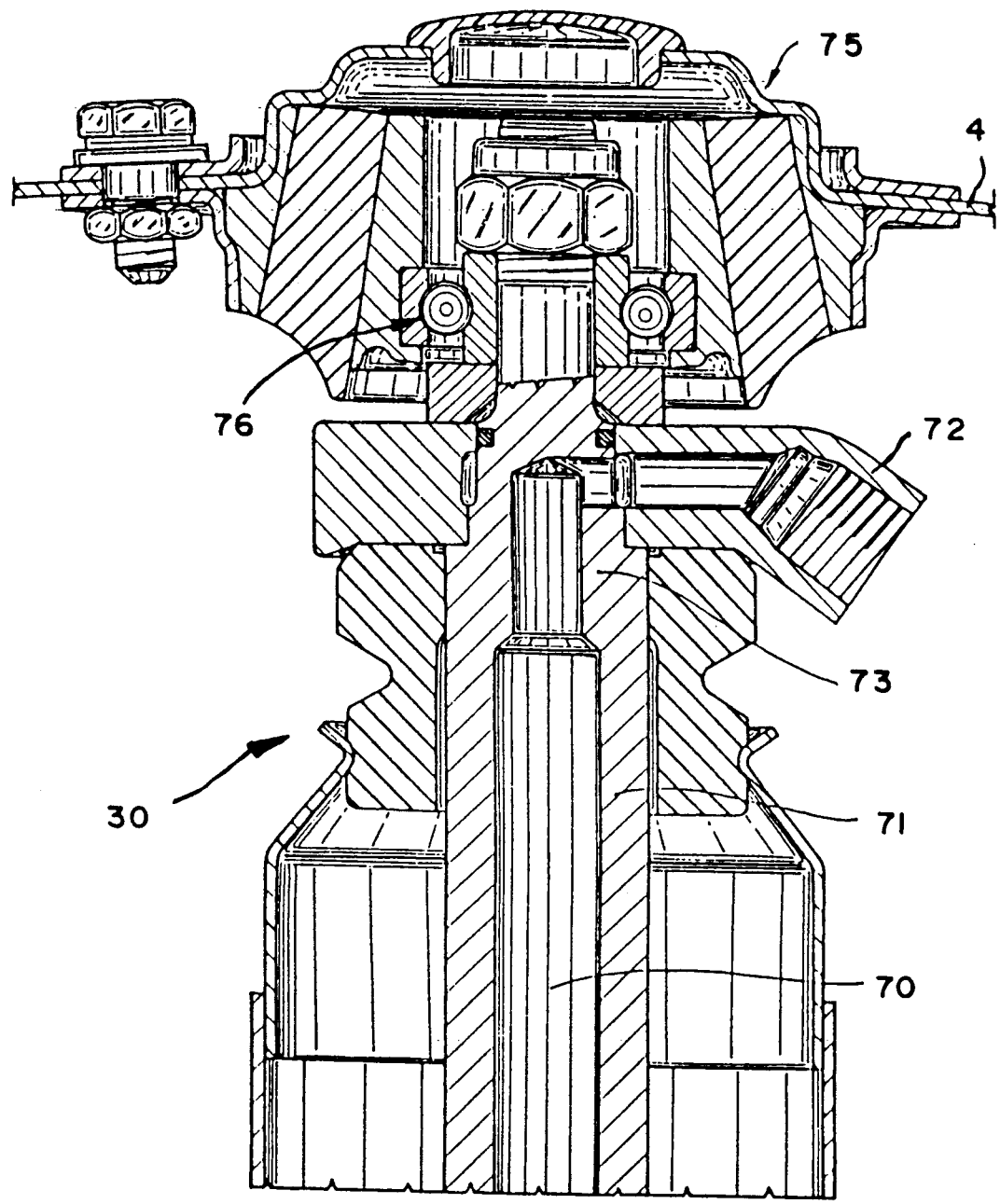
FIG. 2 is a detailed view to an enlarged scale of a damper of the suspension system according to the invention.

In FIGS. 1 and 2 the reference numeral 1 indicates a vehicle, shown diagrammatically, provided with a suspension system indicated overall by 2 for connecting together respective wheels 3 and the body 4 of the vehicle 1. The wheels 3 of this latter are situated at the ends of axles 5 and 6, which in the present case are a front steerable axle 5 controlled by a steering wheel 8 and a rear axle with independent wheels, and are connected to the body 4 by variable-rigidity means, indicated overall by 10, which perform a sustaining function and also adapt to the static and dynamic loads acting on the vehicle 1 and according to the invention are defined by elements exclusively of hydraulic type. In addition to the hydraulic sustaining means, the suspension system 2 comprises a plurality of sensors for sensing the dynamic attitude of the vehicle 1, and a central electronic control unit 11 which receives its input from said sensors and provides an output for controlling the sustaining means of each wheel 3, independently of each other, via respective data and control lines which are shown dashed and are indicated overall by 12. The term "dynamic attitude" of the vehicle 1 as expressed here and in the description given hereinafter means the instantaneous spatial attitude which the moving vehicle 1 assumes as a result of the static and dynamic loads acting on its axles 5 and 6. For this purpose said sensors comprise a longitudinal accelerometer 16 and at least one transverse accelerometer 18 for each axle 5, 6 and connected rigidly to the vehicle body 4, a tachometer sensor 20 of known type for measuring the instantaneous translational speed of the vehicle 1, an attitude sensor 12 for each wheel 3, a sensor 22 for measuring the angular position of the steering wheel 8 and, for each wheel 3, a sensor for measuring the pressure acting on the sustaining means 10 and in this case consisting of a load cell 24 of known type disposed on a respective hydraulic damper 30 supporting each wheel 3.

The sustaining and load adaptation means comprise, for each wheel 3, at least one said hydraulic damper 30 and a hydropneumatic service accumulator 31 permanently connected hydraulically to the interior of the respective damper 30. Each hydropneumatic accumulator 31 is connected to a pressurised fluid source of constant pressure via a respective three-way solenoid control valve 32 of known type, controlled by the central control unit 11. According to the invention, no mechanical sustaining means are provided, such as the classical helical springs mounted on mechanical suspensions of known type such as the MacPherson suspension.

Said source of pressurised fluid, for pressurising the dampers 30, comprises a common main hydraulic accumulator 40 connected hydraulically in parallel with all the service accumulators 31 via a plurality of solenoid valves 32, and a feed pump 41 of one of the vehicle services such as a two-stage pump 41 for feeding the servo-steering system of the vehicle 1, of known type and not shown for simplicity, which withdraws a service fluid such as oil from a reservoir 42 through a line 43 and feeds this fluid, pressurised to a predetermined level, into the accumulator through a hydraulic delivery line 44 in which there are connected a three-way solenoid valve 45 and a non-return valve 46, both of known type, this latter positioned downstream of the valve 46 between it and the accumulator 40. The solenoid valve 45 is controlled by the central control unit 11, and is arranged to selectively connect the delivery 47 of the pump 41 to the accumulator 40 or to the reservoir 42, for example by means of a known spool mechanism the axial position of which is determined by an electromagnet controlled by the central control unit 11, so that the solenoid valve 45 either allows the pressurised fluid fed by the pump 41 to freely pass through the line 44 while at the same time keeping a discharge line 49 connecting the line 44 to the reservoir 42 immediately downstream of the pump 41 closed, or shuts off the line 44 to interrupt all contact between the pump 41 and accumulator 40 and deviate the fluid emerging from the pump 40 directly from its delivery 47 to the discharge line 49, so that when the pump 41 is not required it is free to rotate at no load with low energy consumption and without the need for complicated control devices or devices for disengaging it from the engine of the vehicle 1, of known type and not shown for simplicity, by which it is operated. Under these conditions any return flow of fluid from the accumulator 40 to the discharge line 49 is prevented by the valve 46.

Respective lines 50 and 51, these latter branching from the lines 50 for example by means of three-way joints, are arranged as offtakes from the delivery line 44 to connect the accumulator 40 to the service accumulators 31 of each wheel 3 by way of the respective solenoid valves 32, which are connected in series with the lines 51. The three-way solenoid valves 32, for example by means of a spool device of the same type as that of the valve 45, are able to selectively connect the service accumulators 31 either to the main accumulator 40 or to the reservoir 42, or isolate the accumulators 31 in a fluid-tight manner both from the main accumulator 40 and from the reservoir 42. In this respect, according to the command received from the central control unit 11, the solenoid valves 32 either close the respective lines 51 to isolate the accumulators 31 from the delivery lines 50 and connect the lines 51 to respective discharge lines 60 to enable the fluid contained in the accumulators 31 to discharge to the reservoir 42 so as to reduce the pressure in the accumulators 31, or allow free passage for the pressurised fluid from the lines 50 to the lines 51 while at the same time closing the discharge lines 60 in a fluid-tight manner so that the pressurised fluid produced by the pump 41 accumulates in the accumulators 31 so increasing their internal pressure, or alternatively they completley close both the lines 51 and the lines 60 so as to maintain constant pressure in the accumulators 31 while the pressurised fluid produced by the pump 41 is free to accumulate in the main accumulator 40 until the solenoid valve 45 intervenes to discharge it to the reservoir 42 through the line 49.

With reference to FIG. 2, each damper 30 is in the form of a series-produced hydraulic/hydropneumatic damper of known type and therefore of which only the upper part is shown, this having been modified to enable its interior to communicate with the respective pipe 51 in series with which the relative accumulator 31 is connected, and thus by way of this pipe to communicate with the interior of the accmulator 31 itself, so that the internal pressure of each damper 30, which is otherwise of known type, is at all times substantially equal to that in the respective accumulator 31 to which it is connected. Said connection is made for example by an axial bore 70 provided along the interior of the rod 71 of each damper 30, and a connector 72 fixed in a fluid-tight manner to the outer end 73 of the rod 71, so that it communicates with the axial bore 70. These are the only characteristics by which the dampers 30 differ from normal known series-produced non-variable-pressure dampers of the type normally used in paris with helical springs in known mechanical suspensions not of self-levelling type, such as MacPherson suspensions. For the rest, apart from the absence of said springs, the system for connecting the dampers 30 to the wheels 3 and to the vehicle body 4 is identical to that used in known mechanical suspensions not of the self-levelling type. For example the connection to the vehicle body 4, at least in the case of the dampers of the wheels on the front axle 5, is made by elastic blocks 75 provided in their interior with rolling-contact bearings 76.

According to a further characteristic of the invention, the opposing wheels 3 of each respective axle 5, 6 of the vehicle 1 have their respective dampers 30 and service accumulators 31 connected together by a hydraulic line 80 parallel to the axle and containing a further solenoid valve 81 controlled by the central control unit 11. The lines 80 are connected by an offtake to the lines 51 through respective T connectors 83 and series-connect the feed lines 51 of the sustaining means 10 for each pair of opposing wheels 3 to form a closed circuit, so that when the valves 81 are open pressurised fluid can be transferred from one accumulator 31 to the other for the opposite wheel 3 on the same axle if pressure variations occur between the two accumulators. This transfer is however impossible when the valves 81 are closed. This means that with the passage of fluid from one accumulator 31 to the other, the vehicle can maintain an optimum attitude without requiring energy to be consumed by the pump 41.

The operation of the described suspension system 2 is apparent. Any pitching due to dynamic loads or any attitude variations of the vehicle 1 due to static load variations are sensed by the sensors, and the central control unit 11 operates the valves 32 such as to feed pressurised fluid to the pair of wheels of the more loaded axle, so as to rigidify the sustaining means 10 for said wheels, and thus limit the pitching and/or increase the sustaining capacity so as to balance the load increase. In the case of rolling, the central control unit 11 closes the valves 81 so as to practically immediately rigidify the damper 30 of the more loaded wheel 3, as a result of the flow of pressurised fluid from the accumulator 40 through the respective valve 32, and in such a manner as to reduce the load transmitted by the damper 30 of the less loaded wheel 3, by discharging pressurised fluid through the respective valve 32. As the valves 32 are independently controlled, it is apparent that even non-symmetrical load variations on the wheels of the same axle can be compensated, irrespective of how these occur, and that it is possible to vary the load transfer between the two axles so as to influence the behaviour of the vehicle when taking a bend (under-steering, over-steering).

We claim:

1. A vehicle hydropneumatic suspension system of variable attitude, of the type comprising, for each wheel, sustaining and load adaptation means of variable rigidity, characterised by comprising a plurality of vehicle dynamic attitude sensors and a central electronic control unit connected to said sensors, said sustaining and load adaptation means comprising, for each wheel, at least one respective hydraulic damper of variable internal pressure directly connected hydraulically to a respective hydraulic service accumulator which is connected to a pressure source via a first solenoid valve controlled by said central control unit.

2. A suspension system as claimed in claim 1, characterised in that said pressurised source comprises a main hydraulic accumulator (40) connected hydraulically in parallel with a plurality of said service accumulators (31) via a plurality of said first solenoid valves (32), a feed pump (41) of one of the vehicle services, which withdraws a fluid from a reservoir (42), a second solenoid valve (45) connected in series between said pump and said main accumulator in a hydraulic communication line between them, said second solenoid valve being arranged to selectively connect the delivery of said pump to said main hydraulic accumulator or to said reservoir, and a non-return valve (46) connected in series with said hydraulic connection line between the main accumulator and said pump, immediately downstream of said second solenoid valve.

3. A suspension system as claimed in claim 2, characterised in that said first solenoid valves (32) are three-way solenoid valves arranged selectively to connect said service accumulators (31) either to said main accumulator (40) or to said reservoir (42) or to isolate said service accumulators from said main accumulator and said reservoir in a fluid-tight manner.

4. A suspension system as claimed in claim 1, characterised in that each said hydraulic/hydropneumatic damper of variable internal pressure is defined by a damper (30), the interior of which is made to communicate with a pipe connected to a respective said service accumulator, by means of an axial bore (70) provided in the interior of the damper rod (71) and a connector (72) fixed in a fluid-tight manner to the outer end of said rod, so as to communicate with said axial bore.

5. A suspension system as claimed in claim 1, characterised in that the opposing wheels (3) of each respective vehicle axle (5, 6) are provided with respective support dampers (30) and relative service accumulators (31), which are connected together by a hydraulic line (80) parallel to the axle and containing a third solenoid valve (81) controlled by said central control unit.

6. A suspension system as claimed in claim 1, characterised in that said sensors for sensing the dynamic attitude of the vehicle (1) comprise a longitudinal accelerometer (16), at least one transverse accelerometer (18) for each axle (5, 6) of said vehicle, a sensor for measuring the vehicle speed, an attitude sensor (21) for each said vehicle wheel, a sensor (22) for measuring the angular position of the vehicle stering wheel, and, for each said wheel, a sensor (24) for measuring the pressure acting on said sustaining means.

* * * * *